United States Patent [19]

Hayashi et al.

[11] Patent Number: 4,640,871

[45] Date of Patent: Feb. 3, 1987

[54] MAGNETIC MATERIAL HAVING HIGH PERMEABILITY IN THE HIGH FREQUENCY RANGE

[75] Inventors: Kazuhiko Hayashi; Yoshitaka Ochiai; Masatoshi Hayakawa; Hideki Matsuda; Wataru Ishikawa; You Iwasaki; Koichi Aso, all of Kanagawa, Japan

[73] Assignee: Sony Corporation, Tokyo, Japan

[21] Appl. No.: 773,019

[22] Filed: Sep. 6, 1985

[30] Foreign Application Priority Data

Sep. 12, 1984 [JP] Japan ............................... 59-190973

[51] Int. Cl.[4] ........................ B32B 15/04; G11B 5/147

[52] U.S. Cl. .................................... 428/611; 428/630; 428/635; 428/668; 428/928; 360/126

[58] Field of Search ............... 428/630, 631, 635, 632, 428/668, 928, 611; 360/110, 120, 122, 125, 126, 127

[56] References Cited

U.S. PATENT DOCUMENTS

| | | | |
|---|---|---|---|
| 3,614,830 | 10/1971 | Babe et al. | 360/126 |
| 4,419,415 | 12/1983 | Liefkens et al. | 360/126 |

FOREIGN PATENT DOCUMENTS

| | | | |
|---|---|---|---|
| 163520 | 12/1981 | Japan | 360/126 |
| 3216 | 1/1982 | Japan | 360/126 |

*Primary Examiner*—L. Dewayne Rutledge
*Assistant Examiner*—John J. Zimmerman
*Attorney, Agent, or Firm*—Hill, Van Santen, Steadman & Simpson

[57] ABSTRACT

A magnetic structure having improved permeability characteristics at very high frequencies and comprising a plurality of magnetic metal layers, together with electrically insulating layers which are interposed between successive magnetic metal layers to form a laminate therewith, and at least one conductive strip electrically connecting together at least two of the magnetic metal layers, the conductive strip being of lesser width than the surface on which it is located, and serving to reduce eddy current losses.

3 Claims, 7 Drawing Figures

MAGNETIC MATERIAL HAVING HIGH PERMEABILITY IN THE HIGH FREQUENCY RANGE

BACKGROUND OF THE INVENTION

1. Field of the Invention

The invention is concerned with a magnetic material having high permeability in the high frequency range, including a plurality of magnetic metal layers alternating with electrically insulating layers, together with means for electrically short-circuiting the magnetic metal layers locally between the layers.

2. Description of the Prior Art

As is known from the prior art, ferrites have been widely used as core materials for magnetic transducer heads. Because of the improved characteristics of present-day magnetic recording media, and particularly the requirement for a high coercive force (Hc), there is a recent trend toward the use of metallic materials such as "Sendust", "Permalloy", "Alperm" and amorphous magnetic alloys such as Co—Nb—Zr and Co—Ta—Zr. As the magnetic recording techniques advance, the signal frequency range to be used is raised. For example, there is a demand for magnetic materials which have high permeability in the ultra-high frequency range, for example, in excess of 10 MHz and particularly from several tens MHz to 100 MHz.

As is well known, the specific resistance of magnetic metal materials such as the amorphous magnetic metals or "Sendust" is as low as about 100 $\mu$ ohm.cm. When these magnetic metal materials are used as a core material, the permeability is lowered due to eddy current losses in the high frequency signal range. In order to prevent the occurrence of eddy currents and prevent the lowering of permeability in the high frequency range, it is common to use a magnetic core having a laminated structure. This type of core is formed from the magnetic metal material as mentioned above in a thickness such that the eddy current loss is negligible, superimposing another layer on the magnetic metal layer and consisting of an electrically insulative layer, and repeating the above procedure to form a laminated core having a predetermined thickness.

However, when such a magnetic core of laminated construction is used with the application of an ultra-high frequency signal in the high MHz range, a high frequency eddy current loss takes place with the result that the expected degree of high permeability cannot be achieved. We believe that this is caused by the fact that the two adjoining magnetic metal layers and the insulative layer between them constitute a capacitor and the impedance of the capacitor decreases with an increase in frequency. Consequently, in the above-indicated ultra-high frequency range, particularly in the range of several tens MHz to 100 MHz or higher, the eddy current passes through the capacitor. Thus, materials which ordinarily have high permeability, high saturation magnetic flux density, and similar desirable properties, provide the serious problem of lowering of permeability due to eddy current loss at ultra-high frequencies. A multi-layer laminated arrangement is not the answer because the incorporation of the insulator between two magnetic metal layers provides a capacitor through which eddy current flow can occur at such high frequencies.

SUMMARY OF THE INVENTION

The present invention provides a magnetic material having high permeability in the high frequency range, and has a multi-layer structure, i.e., a laminated structure, of magnetic metal materials having good magnetic characteristics but which suppresses an increase of eddy current loss in the ultra-high frequency range over about 10 MHz.

To achieve the above objective, there is provided a magnetic material having high permeability in a high frequency range which is composed of a plurality of magnetic material layers alternating with layers of electrically insulative material, coupled with a means for electrically short-circuiting the magnetic metal materials locally. The short-circuiting means consists of at least one conductive strip which electrically connects together at least two of the magnetic metal layers, the conductive strip having a lesser width than the surface on which it is located. A plurality of such strips is normally used, each of the strips being electrically isolated from each other. Further, each magnetic metal layer is connected to at least one conductive strip.

In accordance with the present invention, a high permeability material in a high frequency range is provided wherein the eddy current which normally passes through the plurality of magnetic metal layers is confined only to a local short circuit by means of the electrically conductive strip. Thus, an eddy current comprising a large loop, consisting of a large inside area, is not generated thereby effectively preventing a considerable reduction of permeability in the ultrahigh frequency range, particularly over about 10 MHz.

BRIEF DESCRIPTION OF THE DRAWINGS

A further description of the present invention will be made in conjunction with the attached sheets of drawings in which.

DESCRIPTION OF THE PREFERRED EMBODIMENTS

Figure 1:
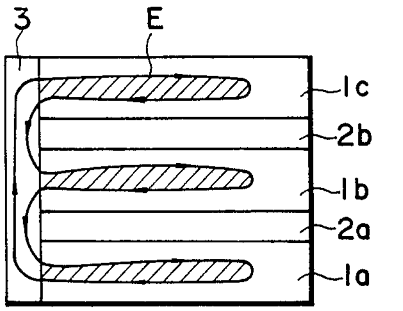
FIG. 1 is a side elevational view of a fundamental embodiment according to the present invention.

FIG. 1 constitutes a side elevational view of a fundamental embodiment according to the invention. A plurality of layers, consisting of three magnetic metal layers 1*a*, 1*b* and 1*c* are alternated with electrically insulative layers 2*a* and 2*b*. A conductive metal layer 3 for electrically locally short-circuiting the magnetic metal layers 1*a*, 1*b*, 1*c* is formed on one side of the superposed layers. In this arrangement, eddy current will flow along the loop E indicated by the arrow in FIG. 1. The portion of the loop E which is shaded in FIG. 1 evidences little variation of magnetic flux by the action of eddy currents and can be regarded as a portion which is free of any magnetic material whatever from the standpoint of permeability.

Figure 2:
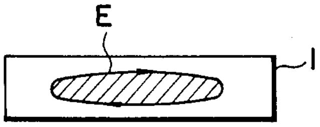
FIG. 2 is an end elevational view of a magnetic metal sheet which constitutes one of the magnetic metal layers.

FIG. 2 shows an end elevational view of the magnetic metal sheet constituting one of the magnetic metal layers. In FIG. 2, when the magnetic flux density varies in a vertical direction with respect to the surface of the sheets shown in the Figure, an eddy current is produced in a direction which impedes the variation of the magnetic flux. When the main flow of the eddy current is expressed by loop E as shown in FIG. 2, the variation in magnetic flux density inside the loop E shown as a shaded portion in FIG. 2 is reduced substantially since a magnetic flux from the outside and the magnetic flux derived from the eddy current exist in opposite directions and are offset. Accordingly, the sectional area of the magnetic metal sheet 1 decreases by approximately the area of the loop E, thus leading to a lowering of the permeability corresponding to that area.

Figure 3:
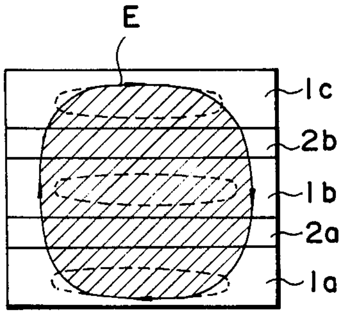
FIG. 3 PRIOR ART
FIG. 3 is a somewhat diagrammatic view of a prior art structure showing how eddy current losses are increased at high frequencies.
Figure 4:
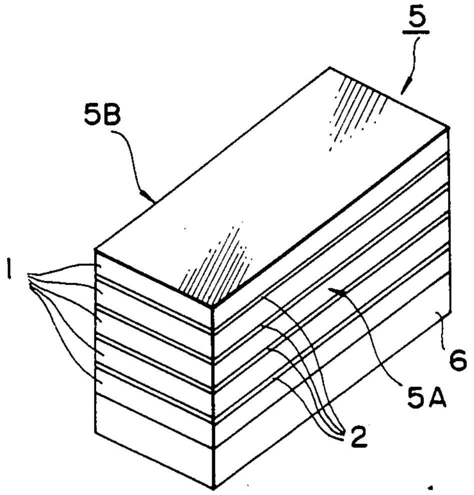
FIG. 4 is a view in perspective of a laminated magnetic structure to which the improvements of the present invention can be applied.

In a laminate of the type shown in FIG. 3, comprising a plurality of layers such as three magnetic metal layers 1*a*, 1*b* and 1*c*, superposed through electrically insulative layers 2*a*, 2*b* interposed therebetween, when the frequency used is relatively low, eddy currents of small loops are produced inside the respective magnetic metal layers 1*a*, 1*b*, 1*c* as indicated by the broken lines in FIG. 3. In the high frequency range, and in particular, at an ultra-high frequency range of 10 MHz or higher, an eddy current exists in a large loop, extending over all the layers as indicated by the loop E and the arrows in FIG. 3. This flow occurs since the impedance of the capacitor formed by the laminate becomes very small. In view of the permeability in the inside of the loop E which is the shaded portion of FIG. 3, the portion corresponding to the loop is not effective magnetically, thus resulting in a considerable loss of permeability.

In contrast, when the laminated product comprising the magnetic metal layers 1*a*, 1*b* and 1*c*, together with the insulative layers 2*a*, 2*b* as arranged in FIG. 1, is provided with a conductive strip 3, for example, on one side of the product and the magnetic metal layers are locally short-circuited, the high frequency eddy current flows mainly through the conductive strip 3. Accordingly, the non-useful region (the shaded portion of FIG. 1) with respect to permeability is considerably reduced over the prior art case shown in FIG. 3. In this manner, the lowering of permeability can effectively be prevented in the ultra-high frequency range.

Preferred embodiments of the magnetic materials having high permeability in a high frequency range according to the invention will be described in comparison with a known arrangement.

A magnetic metal layer obtained by depositing a Co—Ta—Zr material onto a substrate such as a glass plate in a predetermined thickness was prepared using a high frequency magnetron sputtering apparatus. Silicon dioxide was used to form an electrically insulative layer on the magnetic metal layer to a predetermined thickness. These magnetic metal layers and electrically insulative layers were alternately formed to obtain a laminated material 5 useful as a core material in which the plurality of magnetic metal layers were alternated with the insulative layers. The laminated material 5 was formed on a substrate 6 such as a slide glass plate to a desired thickness. The laminated material 5 was deposited under vacuum (e.g. $10^{-5}$ Torr) with a conductive material such as copper on the surfaces 5A and 5B to form a conductive layer having a thickness of several ten thousand Angstroms or more after which the conductive layer deposited on one side 5A and on the other side 5B of the laminated material 5 was partially removed so that the magnetic metal layers were locally short-circuited, i.e., rendered electrically conductive. This may be achieved by making a number of scratches on the copper thin film on one side 5A and on the other side 5B. Alternatively, upon deposition of the conductive layer such as copper, a deposition mask having a desired pattern can be provided on the side surfaces to form discrete conductive layers, electrically separated from each other, and having a pattern such as to cause local short-circuiting between the magnetic layers. As noted previously, the electrically conductive strips should be separated from each other and should not occupy the entire area of the face in which they are located. Each conductive strip should bridge across at least two magnetic strips, and each magnetic strip should be connected to at least one conductive strip.

The magnetic metal layer 1 of the laminated material 5 was found to have an amorphous structure through X-ray diffraction. In addition, it was confirmed through microscopic observation of a section obtained by cutting the laminate 5, including the substrate 6, at the central portion thereof, that any adjacent magnetic metal layers were completely separated by means of the insulative layer 2 consisting of an insulator such as $SiO_2$. The magnetic metal layers 1 were subjected to rotating field annealing at 350° C. for 30 minutes, as is common, to improve the permeability of the amorphous alloys.

A high frequency, high permeability magnetic material making use of the laminate material 5 is described below.

A Co—Ta—Zr amorphous alloy was used having atomic ratios of Co:Ta:Zr=85:8:7. The thickness of each magnetic amorphous layer was 1.9 microns and five layers were superposed. Between two adjacent magnetic layers there was formed a 0.2 micron thick $SiO_2$ insulative layer 2. The resulting laminate 5 was subjected to rotating field annealing, and was then deposited with a copper layer in a thickness of several ten thousand Angstroms. Thereafter, the copper thin film on one side surface 5A was scratched to partially remove the copper film from the side surface. Likewise, the copper thin film on the other side 5B was partially removed, thereby obtaining a magnetic material having high permeability in a high frequency range.

Figure 5:
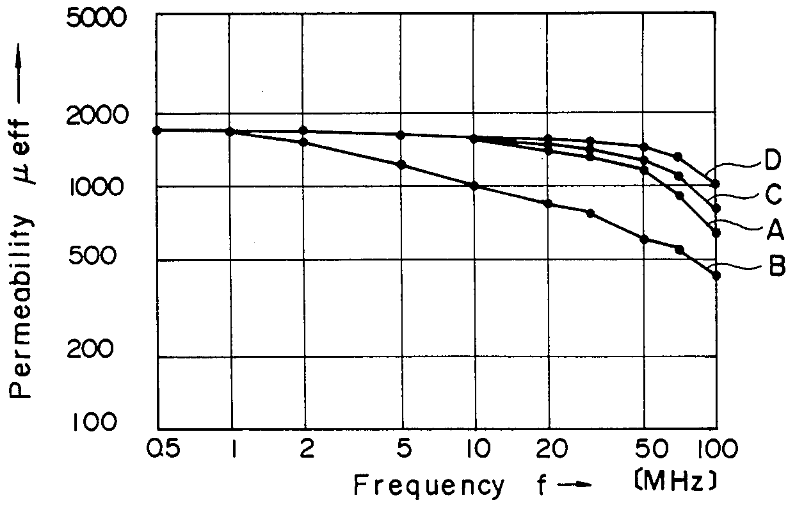
FIG. 5 is a graph of permeability versus frequency at various stages for making the magnetic material.

FIG. 5 shows a graph of permeability, $\mu$, in relation to frequency at various stages for making the magnetic material. More particulary, curve A in FIG. 5 is a characteristic curve obtained after the rotating field annealing and represents values typical of the prior art. Curve B is a permeability-frequency characteristic curve after deposition of the thin copper film, while curve C is a permeability-frequency characteristic after partial removal of the copper thin film from one side 5A. Curve D is permeability-frequency curve obtained after further partial removal of the copper film from the other side 5B.

The permeability was measured using a permeance meter of a figure 8-shaped coil in which the magnetic field for external energization was 10 mOe while varying the frequency from 0.5 MHz to 100 MHz.

As will be apparent from FIG. 5, when the frequency of the external magnetic field is in the range of up to about 10 MHz, the embodiment of the present invention (curve D) and the prior art (curve A) have almost the same values with regard to permeability. When the frequency ranges from 10 to 100 MHz, however, the embodiment of the invention represented by curve D has a lesser lowering of permeability than the prior art (curve A). Thus, it becomes possible to obtain a magnetic material having a high permeability in an ultra-high frequency range. It should be noted that when the copper thin film is partially removed from only one side 5A of the laminate material 5 (curve C), the lowering of permeability in the ultra-high frequency range is relatively small and thus a relatively high permeability can be obtained.

Figure 6:
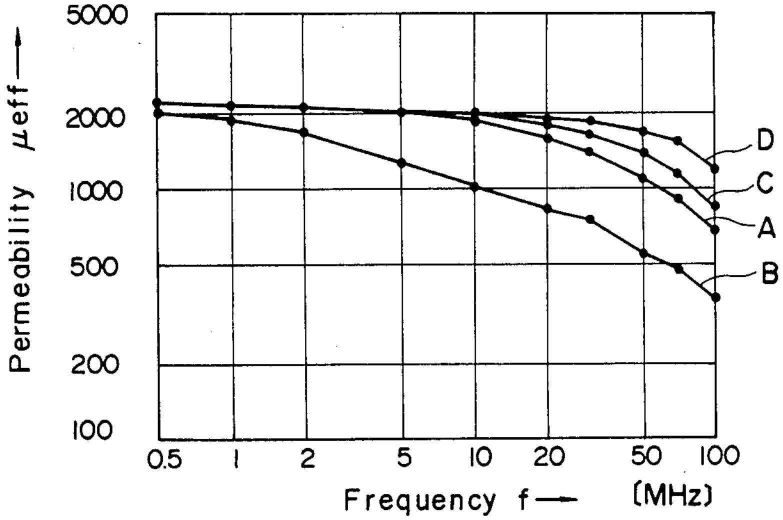
FIG. 6 is a graph similar to FIG. 5 but illustrating another embodiment of the present invention.

A second embodiment of a high frequency, high permeability magnetic material according to the present invention will now be described. The magnetic metal layers consisted of a Co—Ta—Zr amorphous alloy having an atomic ratio Co:Ta:Zr=84:8:8. The metal layers were deposited such that each layer had a thickness of 2.2 microns. Between any adjacent magnetic metal layers there was formed a 0.2 micron thick $SiO_2$ insulative layer, and four magnetic metal layers were superposed. The resulting laminate material was subjected, similar to the first embodiment, to rotating field annealing, copper deposition, and partial removal of the copper thin film from the side surfaces followed by measurement of the permeability-frequency characteristic. The results are shown in FIG. 6. The characteristic curves A–D of FIG. 6 correspond to the curves A–D of the first embodiment. In the case of the second embodiment, it will be seen that the permeability in the ultra-high frequency range above about 10 MHz is improved for the material of the present invention (curve D) as compared with the prior art (curve A).

Figure 7:
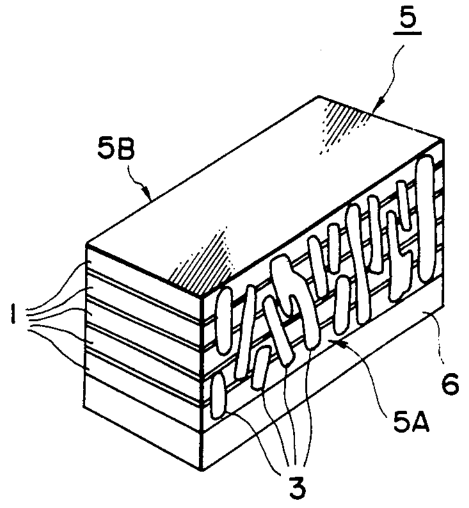
FIG. 7 is a view in perspective of another embodiment.

The embodiment shown in FIG. 7 illustrates magnetic metal layers 1 separated by electrical insulating layers 2. A plurality of electrically conductive strips 3 is shown short-circuiting together two, three, or four magnetic metal layers 1, thereby providing bypasses for eddy currents generated in the magnetic layers.

The present invention should not be construed as being limited to the above embodiments. In general, a magnetic metal or alloy material having a d.c. specific resistance of below 1 milliohm.cm at room temperatures can be deposited in a plurality of layers using an insulator having a d.c. specific resistance at room temperature which is sufficiently greater than the specific resistance of the alloy to obtain a laminate material. This material can be processed to form a local short-circuiting using a conductive material having a d.c. specific resistance not greater than d.c. specific resistance of the magnetic metal or alloy. This permits a bypass for an eddy current generated in the magnetic metal layers. The conductive material may be the same as or different from the magnetic metal material employed. Moreover, all of the magnetic metal layers need not be short-circuited by the same conductor, but each conductor should short-circuit at least two layers.

With regard to the short-circuiting means, it is not necessarily required to form the conductive layer on the side surfaces of the laminate. For example, when an insulative layer is formed between adjacent magnetic layers, openings can be formed through masking or photo-etching. On the insulative layer having openings there is formed a magnetic metal layer so that the magnetic metal layers can be locally contacted with each other through the openings. Alternatively, the insulative layer can be deposited by sputtering or vacuum deposition in a very small thickness to make islands. In the above cases, the magnetic metal materials themselves act as the short-circuiting means.

The present invention thus provides a high permeability material at high frequencies, utilizing a plurality of magnetic metal layers which are locally short-circuited so that an eddy current which would otherwise pass throughout the section of the laminate material is bypassed. Thus, the portion surrounded by the main eddy current path or an inoperative portion in respect to permeability is reduced in area as compared with the case of the prior art. In this way, permeability in the ultra-high frequency range, for example, over 10 MHz can be prevented from substantial reduction.

It will be understood that various modifications can be made to the described embodiments without departing from the scope of the present invention.

What is claimed is:

1. A magnetic structure having improved permeability characteristics at high frequencies comprising:

a plurality of magnetic metal layers, an electrically insulating layer interposed between successive magnetic metal layers to form a laminate therewith, and a plurality of electrical conductive strips each electrically connecting together at least two of said magnetic metal layers, said strips each having a width less than the width of the surface on which they are located, and being electrically isolated from each other.

2. A magnetic structure according to claim 1 in which:

each magnetic metal layer is connected to at least one conductive strip.

3. A magnetic structure according to claim 1 in which:

said magnetic metal layers are composed of a Co—Ta—Zr amorphous alloy and said insulating layers are composed of $SiO_2$.

* * * * *